United States Patent [19]

Omura et al.

[11] Patent Number: 5,703,996
[45] Date of Patent: Dec. 30, 1997

[54] VIDEO REPRODUCTION DEVICE

[75] Inventors: Kazuhiko Omura, Tokai; Masayoshi Iguchi, Nagoya; Masatoshi Yoshiyama, Nagoya; Hiroshi Nishikawa, Nagoya, all of Japan

[73] Assignees: Brother Kogyo Kabushiki Kaisha; Xing Inc., both of Nagoya, Japan

[21] Appl. No.: 383,099

[22] Filed: Feb. 3, 1995

[30] Foreign Application Priority Data

Feb. 4, 1994 [JP] Japan .................................. 6-012607

[51] Int. Cl.$^6$ .................................................. H04N 5/91
[52] U.S. Cl. ................................................ 386/68; 386/77
[58] Field of Search .......................... 358/335, 342, 358/310, 320, 337, 311, 312; 360/9.1, 10.1, 32, 33.1, 48, 51; 386/68, 67, 77, 6, 7, 8, 33, 27, 34, 87, 91, 109, 111, 112, 117; H04N 5/91

[56] References Cited

U.S. PATENT DOCUMENTS

| 4,974,111 | 11/1990 | Platte et al. ........................ 360/14.1 |
| 5,418,658 | 5/1995 | Kwon .................................... 360/48 |
| 5,432,769 | 7/1995 | Honjo ................................... 369/60 |

*Primary Examiner*—Robert Chevalier
*Attorney, Agent, or Firm*—Oliff & Berridge

[57] ABSTRACT

When the data supply rate from the data storing unit 11 drops and the amount of data remaining in the buffer memory 21 decreases, the calculation circuit 25 determines a data reproduction speed at which reproduction should be performed, dependently on the amount of data in the buffer memory 21. Accordingly, the video reading circuit 23 is controlled to retrieve video data from the buffer memory 21 at a reduced reproduction speed. The monitor 13 reproduces a slow motion pictures, which leads to an enhancement of the buffer memory.

19 Claims, 2 Drawing Sheets

VIDEO REPRODUCTION DEVICE

BACKGROUND OF THE INVENTION

1. Field of the Invention

The present invention relates to a video reproduction device for retrieving video data from a video data storing medium and for reproducing images.

2. Description of the Related Art

In a conventional video reproduction device, a drive mechanism drives a video data storing medium, such as a video disk or a CD-ROM, to retrieve video data therefrom. Video data is then outputted to a television monitor, which reproduces images of moving pictures to display.

When a tracking error occurs due to oscillation of the data storing medium, retrieval of video data from the data storing medium stops, and the television monitor immediately stops displaying images. The television monitor provides no images during the period of time required before the drive mechanism recovers and starts a normal tracking operation. Similarly, when a crack forms in the data storing medium, the control portion of the device starts correcting errors generated due to this crack. When this correction starts, the data retrieval from the medium also stops, and the television monitor immediately stops displaying images. The television monitor provides no images during the period of time required to the correct operation.

Video reproduction devices are employed in image karaoke systems for playing accompaniment music of a song to be sung while displaying the song lyrics superimposed on a background image. In image karaoke systems, video data for forming background images is stored separately from song data. Video data is stored in a video disk. While the song data is played, the video reproduction device retrieves the video data from the video disk and displays a background image. When data retrieval from the video disk stops, the television monitor immediately stops displaying images, thereby deteriorating the enjoyment of karaoke users.

SUMMARY OF THE INVENTION

In order to solve the above-described problems, it can be proposed to provide a video reproduction device with a buffer memory. In the device, a memory controller retrieves video data from the data storing medium and records the video data into the buffer memory. The buffer memory temporarily stores the video data. A set of video data for forming each frame is consecutively retrieved from the buffer memory and recorded into a video frame memory. A display controller retrieves video data from the video frame memory and converts the video data into video signals. A television monitor receives the video signals to reproduce images.

Data can be recorded in and retrieved from the buffer memory with high speed. Accordingly, even when data supply from the data storing medium stops, the television monitor does not immediately stop displaying images. The television monitor continuously displays images until all the data stored in the buffer memory is retrieved therefrom.

However, when all the data stored in the buffer memory is retrieved therefrom but video data is not still supplied from the data storing medium, the television monitor rapidly stops displaying images. It is therefore desirable that the buffer memory be capable of storing data for the entire time period during which no data is supplied from the data storing medium. However, buffer memory cannot store such a great amount of data, and therefore cannot compensate for long stop in supply of data.

It is an objective of the present invention to overcome the above-described problems, and to provide a video reproduction device which can compensate for long stop in supply of data.

Another object is to provide a video reproduction device which can compensate for the stop in supply of data so as not to be noticed by users.

In order to achieve the above objects, the present invention controls to change the speed, at which video data is retrieved from the buffer memory and reproduced, when the supply of the video data from the data storing medium stops or its supply rate drops. This data retrieving/reproducing speed control allows the buffer memory to compensate for a long period of interruption in supply of data. The retrieving/reproducing speed may be changed step by step, dependently on the amount of video data being stored in the buffer memory. This gradual change in the data retrieving/reproducing speed will not be noticed by users.

In order to attain the above objective and other objectives, the present invention therefore provides a video reproduction device for reproducing video data from a video data storing medium, the device comprising: data temporary storing means for temporarily storing video data retrieved from a video data storing medium; data reproducing means for retrieving the video data from the data temporary storing means and for reproducing images; and retrieving speed control means for controlling a retrieving speed, at which the data reproducing means retrieves the video data from the data temporary storing means, dependently on an amount of the video data being stored in the temporary storing means.

The retrieving speed control means may include: data amount detecting means for detecting the amount of the video data being stored in the temporary storing means; data amount comparing means for comparing the detected amount of the video data with respect to a predetermined amount; and speed changing means for changing the retrieving speed into a speed corresponding to the detected amount of the video data, according to the compared result. The speed changing means may decrease the retrieving speed into a speed corresponding to the detected amount of the video data, if the detected amount of the video data becomes lower than the predetermined amount of the video data. The speed changing means may increase the retrieving speed into a speed corresponding to the detected amount of the video data, if the detected amount of the video data becomes higher than the predetermined amount of the video data.

The retrieving speed control means may repeatedly control the retrieving speed, at a predetermined time interval, so as to change the retrieving speed step by step at the predetermined time interval. The data amount detecting means may repeatedly detect the amount of the video data being stored in the temporary storing means, at the predetermined time interval, the detected amount of the video data falling in either one of a plurality of predetermined data amount ranges, a plurality of different speed values being predetermined in correspondence with the plurality of data amount ranges, the data amount comparing means determining the one predetermined data amount range in which the detected amount of the video data falls, the speed changing means determining the retrieving speed into a speed value corresponding to the determined one predetermined data amount range.

According to another aspect, the present invention provides a video reproduction device for retrieving video data from a video data storing medium and for reproducing a moving picture represented by the video data, the device comprising: data temporary storing means for temporarily storing video data, representative of a moving picture, retrieved from a video data storing medium; data reproducing means for retrieving the video data from the data temporary storing means and for reproducing the corresponding moving picture; reproduction speed determining means for determining a reproduction speed, at which the data reproducing means retrieves the video data from the data temporary storing means and reproduces the corresponding moving picture, to have a value selected from one of a first predetermined value and at least one second predetermined value lower than the first predetermined value, dependently on an amount of the video data being stored in the temporary storing means; and reproduction control means for controlling the data reproducing means to retrieve the video data from the data temporary storing means at the determined reproduction speed and to reproduce the moving pictures with the determined reproduction speed, the data reproduction means controlled to retrieve the video data at the first predetermined speed reproducing a normal moving picture with the first reproduction speed, the data reproducing means controlled to retrieve the video data at each of the at least one second predetermined reproduction speed reproducing a slow motion picture with the corresponding second reproduction speed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

Figure 1:
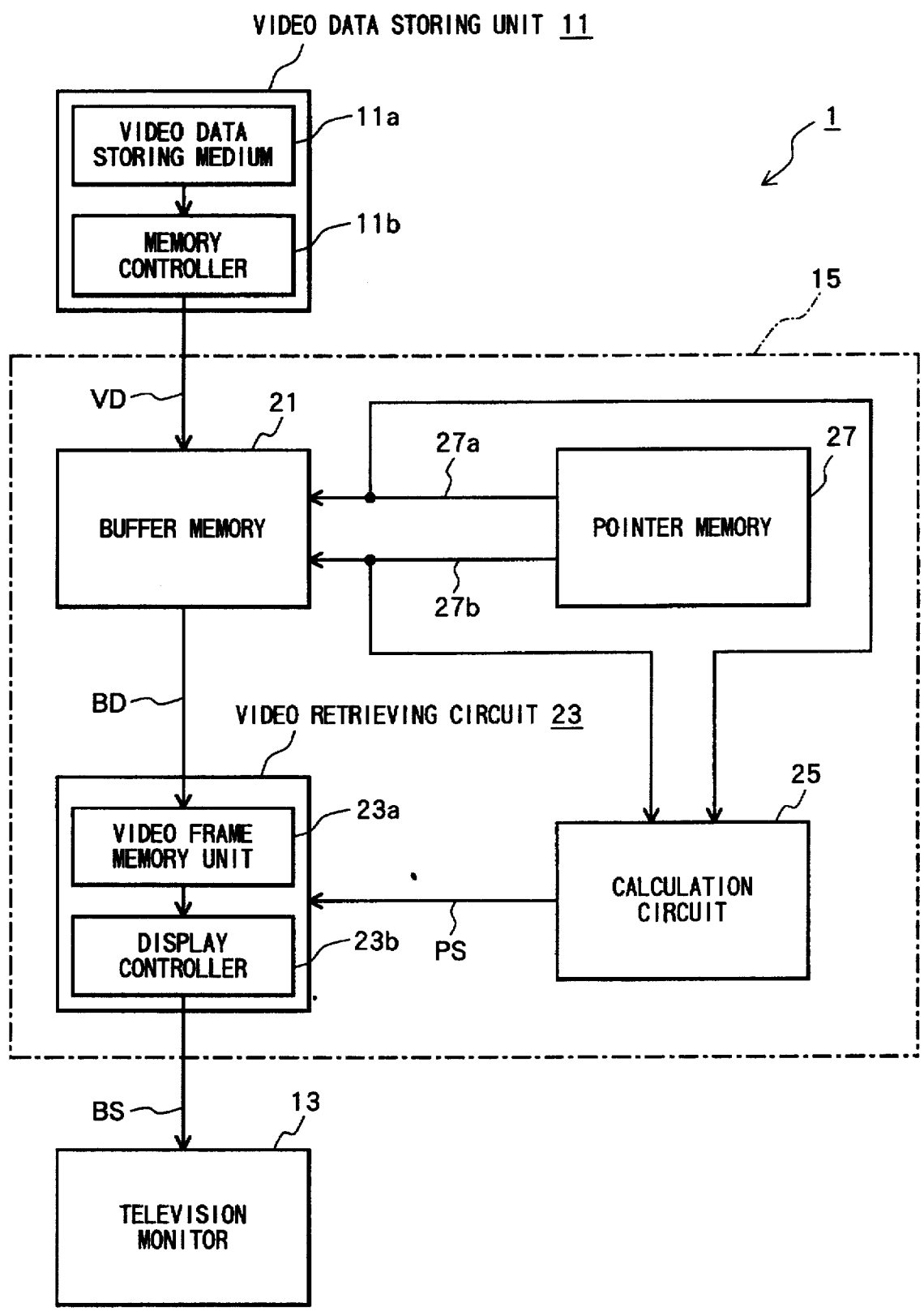
FIG. 1 is a block diagram showing a structure of a video reproduction device of an embodiment of the present invention.

An embodiment of a video reproduction device according to the present invention will be described below while referring to the accompanying drawings wherein like parts and components are designated by the same reference numerals to avoid duplicating description.

FIG. 1 shows a video reproduction device 1 of the embodiment of the present invention. The video reproduction device 1 is provided with a video data reproduction circuit 15. The reproduction circuit 15 is for retrieving video data VD from a video data storing unit 11, for reproducing the video data VD to produce video signals BS, and for transmitting video signals BS to a television monitor 13. The monitor 13 is for reproducing images (moving pictures) to display, based on the supplied video signals. The reproduction circuit 15 includes a buffer memory 21, a video retrieving circuit 23, a calculation circuit 25, and a pointer memory 27.

The video data storing unit 11 includes a video data storing medium 11a, such as a video disk, a CD-ROM, or the like for storing video data. A memory controller 11b is also provided in the unit 11 for retrieving video data VD from the data storing medium and for outputting the video data from the unit 11. The buffer memory 21 is connected to the video data storing unit 11 for recording the video data VD outputted from the unit 11, at a memory position indicated by a record pointer 27a outputted from the pointer memory 27. The buffer memory 21 is for temporarily storing the video data VD. The buffer memory 21 is also for outputting, as buffer data BD, the video data stored at a memory position indicated by a retrieve pointer 27b outputted from the pointer memory 27.

The pointer memory 27 is for outputting a record pointer 27a indicating a position in the buffer memory 21 into which the video data VD is being inputted from the video data storing unit 11 and for outputting a retrieve pointer 27b indicating a position in the buffer memory 21 from which the buffer data BD is being retrieved to the data retrieving circuit 23. Accordingly, video data VD is always being stored in the buffer memory 21 between the memory positions indicated by the pointers 27a and 27b.

The calculation circuit 25 is for inputting both the record pointer 27a and the retrieve pointer 27b from the pointer memory 27. The calculation circuit 25 is for calculating an amount of video data presently stored in the buffer memory 21, based on the pointers 27a and 27b. The calculation circuit 25 is for determining a reproduction speed command PS, based on the calculated result, and is for outputting the command PS to the video retrieving circuit 23. The calculation circuit 25 may be a microcomputer.

The video retrieving circuit 23 is for retrieving the buffer data BD from the buffer memory 21, based on the reproduction speed command PS, and for outputting video signals BS to the television monitor 13. More specifically, the video retrieving circuit 23 includes a video frame memory unit 23a for consecutively retrieving a set of video data for forming each frame, as the buffer data BD, from the buffer memory 21. The video frame memory unit 23a includes a control portion (not shown) for retrieving the buffer data BD from the buffer memory 21 and a memory portion (also not shown) for storing the buffer data. In the video retrieving circuit 23, a display controller 23b is also provided to retrieve the buffer data BD from the video frame memory unit 23a, to convert the video data into video signals BS, and to output the video signals BS to the television monitor 13. The television monitor 13 receives the video signals BS to reproduce images.

Assume now that the video data stored in the video data storing medium is for creating a normal speed moving picture from 30 frames every second. The video reproduction device of this embodiment is designed so as to retrieve video data from the data storing unit 11 at a speed wherein 30 frames worth of data is retrieved in a second and outputted at the same speed to the television monitor 13. More specifically, the memory controller 11b is designed to retrieve 30 frames worth of video data VD from the medium 11a in a second. The video frame memory unit 23a is also designed to retrieve 30 frames worth of video data (buffer data) BD from the buffer memory 21 in a second. The display controller 23b converts the 30 frames worth of buffer data BD into 30 frames worth of video signals, and outputs the thus produced 30 frames worth of video signals to the television monitor 13 in a second. The television monitor 13 reproduces the 30 frames of video signals in a second to display 30 frames of images of a normal speed moving picture.

The video reproduction device 15 having the above-described structure operates, as described below.

Video data VD is retrieved from the video storing unit 11 and recorded in the buffer memory 21 at a memory position according to a record pointer 27a. According to a request from the video retrieving circuit 23, buffer data BD, stored in the buffer memory 21 at a memory position indicated by a retrieve pointer 27b, is outputted from the buffer memory 21. The calculation circuit 25 calculates a desired reproduction speed, based on the pointer values 27a and 27b. The calculation circuit 25 then produces a reproduction speed command PS and outputs it to the video retrieving circuit 23. The reproduction speed command PS indicates the desired reproduction speed, at which the data video retrieving circuit 23 should reproduce buffer data BD from the buffer memory 21.

The operation conducted by the calculation circuit 25 will be described below while referring to FIG. 2.

When the video reproduction device is turned on, this operation starts. First, the calculation circuit 25 receives the pointer values 27a and 27b from the pointer memory 27 and calculates a frame amount F of video data VD presently stored in the buffer memory 21, in S10. The frame amount F represents the number of frames formed by the video data presently stored in the buffer memory. Because video data is being always stored in the buffer memory 21 between the positions indicated by the pointers 27a and 27b, the frame amount F is obtained by dividing a difference between the pointer values 27a and 27b by the amount of video data constituting a single frame. When the video data is not compressed, the video data amount for a single frame is determined by both the number of picture elements constituting a single frame and the number of colors also constituting the single frame. When the video data is compressed, the video data amount for a single frame can be calculated approximately based on an average compression rate.

Then, S20 through S50 are conducted to compare the calculated frame amount F with several predetermined values. S20 is for judging whether the frame amount F is equal to zero (0). If F is not equal to zero (0) (i.e., "No" in S20,) S30 is conducted to judge whether F is lower than 10. If F is equal to or higher than 10 (i.e., "No" in S30,) S40 is conducted to judge whether F is lower than 30. If F is equal to or higher than 30 (i.e., "No" in S40,) S50 is conducted to judge whether F is lower than 60. If F is equal to or higher than 60 (i.e., "No" in S50,) S60 is conducted to produce a reproduction speed command PS to perform a reproduction operation at a normal reproduction speed. The normal speed indicated by the step S60 controls the video frame memory unit 23a to retrieve 30 frames worth of video data from the buffer memory 21 in a second. The display controller 23b converts the thus retrieved 30 frames worth of video data into 30 frames worth of video signals and supplies them to the television monitor 13. The television monitor 13 displays a normal speed moving pictures in a second.

An affirmative judgement in any of the steps S20 through S50 determines a reproduction speed at which a reproduction is to be performed. When the judgement in S20 is affirmative, that is, when F equals zero (0), it is judged that no video data remains in the buffer memory 21. In this case, a reproduction speed command PS which indicates a reproduction speed of zero value is produced for one second in S70. The video frame memory unit 23a controlled by this command PS stops retrieving video data from the buffer memory 21. The display controller 23b creates 30 frames worth of same video signals from a single frame worth of video data that has been supplied latest to the video frame memory unit 23a. As a result, the television monitor 13 reproduces a still picture for one second.

When the judgement in S30 is affirmative, that is, when 0<F<10, S80 produces a reproduction speed command PS for indicating a reproduction speed wherein only 10 frames are reproduced over a one second interval. The video frame memory unit 23a controlled by this command PS retrieves 10 frames worth of video data from the buffer memory 21 over one second. The display controller 23b creates 30 frames worth of video signals from the thus supplied 10 frames worth of video data. The television monitor 13 therefore performs reproduction for one second of slow motion pictures at a reproduction rate of ⅓ the normal reproduction speed.

When the judgement in S40 is affirmative, that is, when 10≦F<30, S90 produces a reproduction speed command PS to reproduce 20 frames over a one second interval. The data retrieving circuit 23 controlled by this command PS retrieves 20 frames worth of video data from the buffer memory 21 over one second. The display controller 23b creates 30 frames worth of video signals from the thus supplied 20 frames worth of video data. The television monitor performs reproduction for one second of slow motion pictures at a reproduction rate of ⅔ the normal speed.

When the judgement in S50 is affirmative, that is, when 30≦F<60, S100 produces a reproduction speed command PS to reproduce 25 frames over a one second interval. The data retrieving circuit 23 controlled by this command PS retrieves 25 frames worth of video data from the buffer memory over one second. The display controller 23b creates 30 frames worth of video signals from the thus supplied 25 frames worth of video data. As a result, the television monitor performs reproduction for one second of slow motion pictures at a reproduction rate of 25/30 the normal speed.

The above-described processes are repeatedly performed at a time interval of one second. Thus, as the frame amount F in the buffer memory 21 decreases to become lower than 60, 30, and 10, in this order, the reproduction frame number is decreased to 25, 20, and 10 per second in this order. Thus decreased reproduction speed can control the television monitor 13 to reproduce slow motion pictures. Accordingly, the buffer memory 21 can compensate for a longer interruption in data supply, relative to the case where the reproduction speed is maintained unchanged at the normal speed.

According to this operation, even when data supply from the data storing unit 11 stops, the decrease in the reproduction speed can lengthen the buffer-compensatable time period. When the data supply starts during this lengthened buffer-compensated time period, the reproduction speed is increased through steps S80, S90, and S100 back to the normal speed.

As described above, according to the present embodiment, when the data supply from the data storing unit 11 stops, the reproduction speed is decreased step by step to enhance the function of the buffer 21. When the data supply recovers its normal state, the reproduction speed is increased step by step. The gradual change in reproduction speed will not be noticed by users.

In the above-described embodiment, when the buffer data amount F becomes lower than 60 frames, the decrease in the reproduction speed is started. However, this value of determining the speed decrease start timing is not limited to 60 frames. Additionally, in the above description, the reproduction speed is decreased through three steps. However, the reproduction speed can be decreased through any number of steps. The number of steps, three in the preferred embodiment (i.e., S100, S90 and S80) for decreasing reproduction speed need not be necessarily equal to the number of steps (i.e., S80, S90 and S100) for increasing reproduction speed.

For example, while the reproduction speed is decreased through four steps, the reproduction speed may be increased through three steps. Similarly, the values by which the reproduction speed is decreased in each step need not necessarily equal values by which the reproduction speed is increased. For example, when decreasing, the reproduction speed is changed from the normal speed to ¾, ⅔, ½ and then to ⅓ of the normal speed. When increasing, the reproduction speed may be changed from the ⅓ of the normal speed to ⅔, ⅗, ¾ of the normal speed, and finally back to the normal speed. These parameters should preferably be determined according to differences in visual sensitivity to increases and decreases in the reproduction speed.

Properly setting these parameters of the steps for reproducing slow motion pictures can fully prevent all the video data from being retrieved from the buffer memory 21. In this case, the steps S20 and S70 for reproducing a still picture may be omitted.

In the above description, when all the data is completely retrieved from the buffer memory 21, the reproduction speed is set to zero to reproduce a still picture at S70. However, the reproduction speed may be set to zero even when some data remains in the buffer memory 21.

Figure 2:
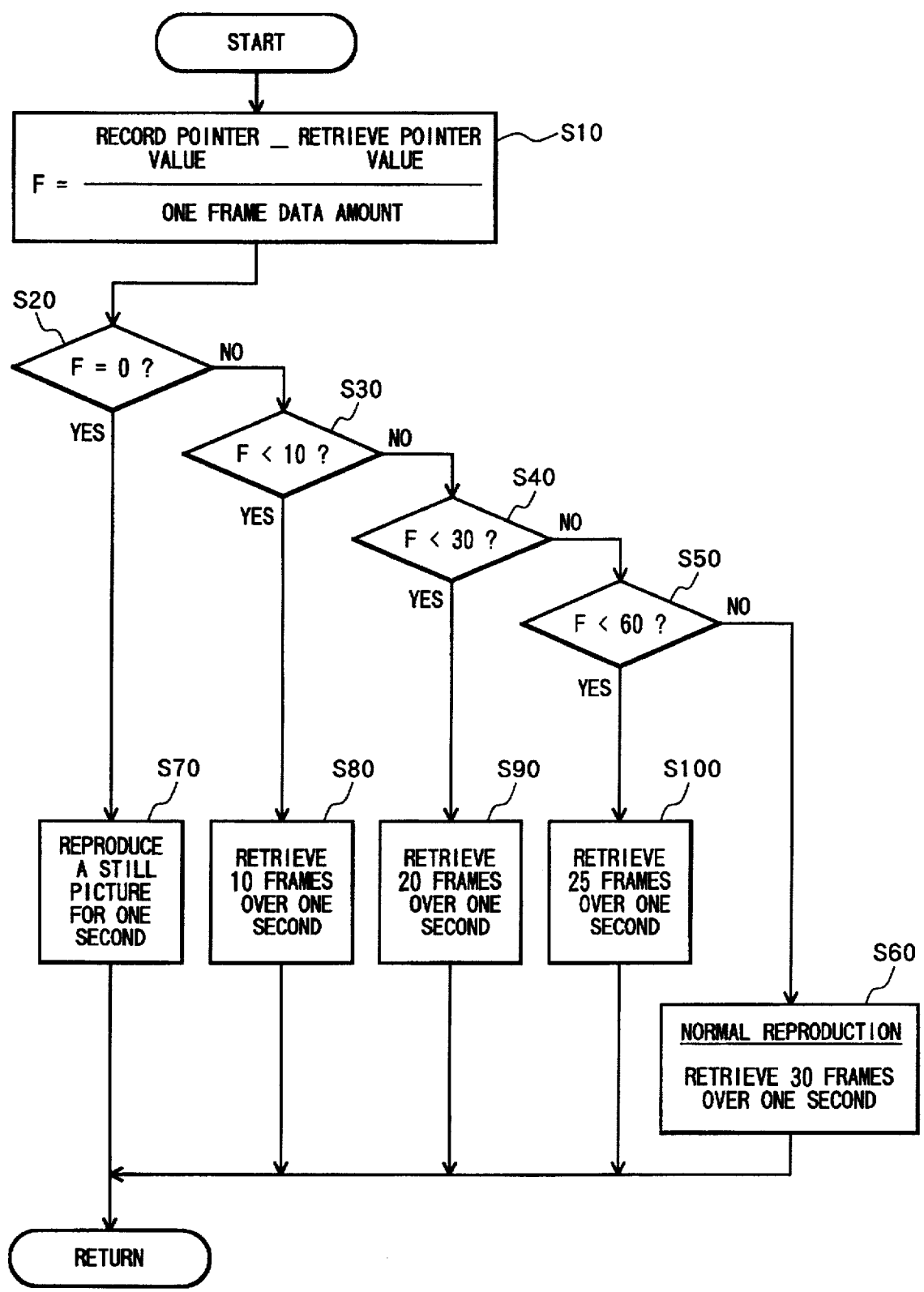
FIG. 2 is a flowchart showing processes for determining a reproduction speed implemented by a calculation circuit in the video reproduction device.

The process shown in FIG. 2 is described as always being conducted regardless of whether data retrieval from the data storing unit 11 is being performed well or not. When retrieval is being performed well, S60 is always conducted. Alternatively, the operation of FIG. 2 may be performed selectively through a threshold judgement. According to this threshold judgement, while F is 90 or more, for example, the routine of FIG. 2 is not performed. The routine is conducted only when F drops to below 90.

In the above description, the buffer memory 21, the pointer memory 27, and the calculation circuit 25 are included in the video reproduction circuit 15. However, they may be integrally provided in the video data storing unit 11, so that only the video retrieving circuit 23 is included in the video reproduction circuit 15. In this case, the video frame memory unit 23a is designed to always retrieve each frame worth of video data (buffer data BD) from the buffer memory 21 at a fixed time interval (1/30 second, in this example.) The video frame memory unit 23a is, however, controlled by the reproduction speed command PS to retrieve the buffer data BD of the same frame from the buffer memory 21 a number of times that is inversely proportional to the reproduction speed. Thus, the reproduction speed is adjusted by changing the number of times at which the same frame buffer data is to be outputted.

The video data reproduction device of this embodiment can be applied to an image karaoke system. In the image karaoke system, the video data is stored separately from the song data. While the song data is played, the video data is reproduced to display a background image. The video data is stored in video disks in the data storing unit 11. According to the present embodiment, even when supply of the video data from the data storing unit 11 stops, the background image is continuously displayed while some video data still remains in the buffer memory 21. Accordingly, it is possible to prevent stop of display of background images and prevent deteriorating the enjoyment of image karaoke users. The decrease in the reproduction speed lets the buffer memory 21 compensate for a longer stop in data supply, relative to the case where the reproduction speed is unchanged. The gradual change in the reproduction speed will not be noticed by karaoke users.

The present invention can be applied for systems other than image karaoke systems. The same set up can be used for providing background music or background images to eating and drinking establishments and to special event grounds.

As described above, according to the present invention, when the amount of video data stored in the buffer memory decreases, the reproduction speed at which the video data is retrieved from the buffer memory is decreased. Accordingly, thus decreasing the reproduction speed lets the buffer memory compensate for a long stop in data supply.

According to the present invention, the reproduction speed is decreased from a normal speed step by step. For example, the speed is first decreased to ¾ of the normal speed, then to ⅔, to ½, and finally to ⅓ of the normal speed. This gradual drop in the reproduction speed is less noticeable to users. Similarly, in order to increase the speed from the ⅓ of the normal speed back to the normal speed, the speed may be increased first to ½ of the normal speed, then to ⅔ and ¾ of the normal speed, and finally back to the normal speed.

The time interval at which the reproduction speed is changed according to the data amount F may be adjusted. In the above-described embodiment, the processes shown in FIG. 2 are repeatedly conducted at every one second. This time interval may be variously changed. It is noted, however, that the time interval should not be shortened into a very small value. If the time interval is very short, even if each process is intended to change the reproduction speed step by step, the human eye will notice this change as a rapid change.

While the invention has been described in detail with reference to the specific embodiment thereof, it would be apparent to those skilled in the art that various changes and modifications may be made therein without departing from the spirit of the invention, the scope of which is defined by the attached claims.

What is claimed is:

1. A video reproduction device for reproducing video data from a video storing medium, the dvice comprising:

data temporary storing means for receiving video data supplied from a video data storing medium and for temporarily storing the video data;

data reproducing means for retrieving the video data from the data temporary storing means and for reproducing images;

reproduction speed determining means for determining a reproduction speed, at which the data reproducing means retrieves the video data from the data temporary storing means and reproduces the corresponding moving picture, to have a value selected from one of a first predetermined value and a second predetermined value lower than the first predetermined value, dependently on an amount of the video data being stored in the temporary storing means; and reproduction control means for controlling the reproducing means to retrieve the video data from the data temporary storing means at the determined reproduction speed and to reproduce the moving pictures with the determined reproduction speed, the data reproduction means controlled to retrieve the video data at the first predetermined speed reproducing a normal moving picture with the first reproduction speed, the data reproducing means controlled to retrieve the video data at the second predetermined reproduction speed reproducing a still picture with the second reproduction speed, thereby allowing the data reproducing means to continuously reproduce images regardless of whether the supply of the video data from the data storing medium is stopped.

2. A video reproduction device of claim 1, wherein the retrieving speed control means includes:
   data amount detecting means for detecting the amount of the video data being stored in the temporary storing means;
   data amount comparing means for comparing the detected amount of the video data with respect to a predetermined amount; and
   speed changing means for changing the retrieving speed into a speed corresponding to the detected amount of the video data, according to the compared result.

3. A video reproduction device of claim 2, wherein the speed changing means decreases the retrieving speed into a speed corresponding to the detected amount of the video data, if the detected amount of the video data becomes lower than the predetermined amount of the video data.

4. A video reproduction device of claim 2, wherein the speed changing means increases the retrieving speed into a speed corresponding to the detected amount of the video data, if the detected amount of the video data becomes higher than the predetermined amount of the video data.

5. A video reproduction device of claim 2, wherein the retrieving speed control means repeatedly controls the retrieving speed, at a predetermined time interval, so as to change the retrieving speed step by step at the predetermined time interval.

6. A video reproduction device of claim 5, wherein the data amount detecting means repeatedly detects the amount of the video data being stored in the temporary storing means, at the predetermined time interval, the detected amount of the video data falling in either one of a plurality of predetermined data amount ranges, a plurality of different speed values being predetermined in correspondence with the plurality of data amount ranges, the data amount comparing means determining the one predetermined data amount range in which the detected amount of the video data falls, the speed changing means determining the retrieving speed into a speed value corresponding to the determined one predetermined data amount range.

7. A video reproduction device of claim 1, wherein the data temporary storing means includes a buffer memory for receiving the video data retrieved from the video data storing medium and for temporarily storing the video data.

8. A video reproduction device of claim 7, wherein the retrieving speed control means includes:
   a pointer memory for outputting a record pointer indicating a position in the buffer memory into which the video data is being inputted from the video data storing medium and a retrieve pointer indicating a position in the buffer memory from which the video data is being retrieved to the data reproducing means; and
   a calculation circuit for receiving the record pointer and the retrieve pointer, for determining a frame amount by dividing the difference between the record pointer and the retrieve pointer by an amount of video data constituting a single frame, and for determining a reproduction speed command indicating the number of frames of video data to be retrieved from the buffer memory in a predetermined time period, and
   wherein the data reproducing means receives the reproduction speed command and retrieves at least one set of video data for forming at least one frame of moving pictures in the predetermined time period, the number of the retrieved video data set being indicated by the reproduction speed command.

9. A video reproduction device of claim 8, wherein the data reproducing means includes:
   a video frame memory unit for receiving the reproduction speed command, for consecutively retrieving a set of video data for forming each frame of moving pictures at a retrieving speed indicated by the received reproduction speed command, and for storing the set of video data; and
   a display controller for producing video signals based on the set of video data stored in the video frame memory unit.

10. A video reproduction device of claim 9, wherein the calculation circuit repeatedly detects the frame amount being stored in the buffer memory, at a predetermined time interval, the detected amount of the video data falling in either one of a plurality of predetermined frame amount ranges, a plurality of different numbers of video data sets being predetermined in correspondence with the plurality of frame amount ranges, the calculation circuit determines the one predetermined frame amount range in which the detected frame amount falls, the calculation circuit then determines the reproduction speed command indicating the number of sets of video data to be retrieved from the buffer memory during a time period corresponding to the predetermined time interval, the number of sets of video data corresponding to the determined one frame amount range, the reproduction speed command controlling the video frame memory unit to retrieve at least one set of video data at a retrieving speed indicated by the reproduction speed command in the corresponding time period.

11. A video reproduction device of claim 9, further comprising a data storing unit including the video data storing medium for storing video data and a memory controller for consecutively retrieving the video data from the video data storing medium and for outputting the video data to the data temporary storing means.

12. A video reproduction device of claim 11, further comprising a television monitor for receiving the video signals and for reproducing a corresponding frame of moving pictures.

13. A video reproduction device of claim 1, wherein the retrieving speed corresponds to an amount of video data to be retrieved by the data reproducing means from the data temporary storing means in a predetermined time period, the retrieving speed control means controlling the retrieving data amount, dependently on the amount of the video data being stored in the temporary storing means.

14. A video reproduction device of claim 1, wherein the retrieving speed corresponds to a number of times, at which the data reproducing means repeatedly retrieves the same video data from the data temporary storing means, the retrieving speed control means controlling the number of times, dependently on the amount of the video data being stored in the temporary storing means.

15. A video reproduction device of claim 1,
   wherein the retrieving speed control means controls the retrieving speed into one of a first predetermined retrieving speed and at least one second predetermined retrieving speed lower than the first predetermined retrieving speed, dependently on the amount of the video data being stored in the temporary storing means, and
   wherein the data reproducing means controlled by the retrieving speed control means to retrieve the video data at the first predetermined retrieving speed reproduces a moving picture of a normal speed corresponding to the first retrieving speed, and the data reproducing means controlled by the retrieving speed control means to retrieve the video data at each of the at least one second predetermined retrieving speed reproduces a slow motion picture with its speed corresponding to the corresponding second retrieving speed.

16. A video reproduction device of claim 15,
wherein the retrieving speed control means controls the retrieving speed into one of the first predetermined retrieving speed, the at least one second predetermined retrieving speed lower than the first predetermined retrieving speed, and a third predetermined retrieving speed lower than the second retrieving speed, dependently on the amount of the video data being stored in the temporary storing means, and wherein the data reproducing means controlled by the retrieving speed control means to retrieve the video data at the third predetermined retrieving speed reproduces a still picture.

17. A video reproduction device for retrieving video data from a video data storing medium and for reproducing a moving picture represented by the video data, the device comprising:

data temporary storing the means for temporarily storing video data, representative of the moving picture, retrieved from the video data storing medium;

data reproducing means for retrieving the video data from the data temporary storing means and for reproducing the corresponding moving picture;

reproduction speed determining means for determining a reproduction speed, at which the data reproducing means retrieves the video data from the data temporary storing means and reproduces the corresponding moving picture, to have a value selected from one of a first predetermined value and at least one second predetermined value lower than the first predetermined value, dependently on an amount of the video data being stored in the temporary storing means; and reproduction control means for controlling the data reproducing means to retrieve the video data from the data temporary storing means at the determined reproduction speed and to reproduce the moving pictures with the determined reproduction speed, the data reproduction means controlled to retrieve the video data at the first predetermined speed reproducing a normal moving picture with the first reproduction speed, the data reproducing means controlled to retrieve the video data at each of the at least one second predetermined reproduction speed reproducing a slow motion picture with the corresponding second reproduction speed.

18. A video reproduction device of claim 17, further comprising a data storing unit including the video data storing medium for storing a plurality of sets of video data representative of a plurality of frames of the moving picture and a memory controller for consecutively retrieving the plurality of sets of video data from the video data storing medium and for outputting plurality of sets of video data to the data temporary storing means, wherein the data temporary storing means includes a buffer memory for receiving the plurality of sets of video data consecutively retrieved from the video data storing medium and for temporarily storing the video data, wherein the reproduction speed determining means includes:

a detection unit for detecting an amount of the video data presently stored in the buffer memory; and a command producing unit for producing, based on the detected result, a reproduction speed command indicative of a reproduction speed selected from the first and second reproduction speeds, the reproduction speed command indicative of the first reproduction speed representing a first number of sets of video data to be retrieved from the buffer memory in a predetermined time period, the reproduction speed command indicative of each of the at least one second reproduction speed representing corresponding second number of sets of video data to be retrieved from the buffer memory in the predetermined time period, and wherein the data reproducing means includes:

a video frame memory unit for receiving the reproduction speed command and for consecutively retrieving several sets of video data for forming several frames of the moving picture, the number of the video data sets to be retrieved in the predetermined time period being equal to either one of the first and second numbers indicated by the reproduction speed command;

a display controller for producing several sets of video signals in the predetermined time period, based on the video data retrieved by the video frame memory unit, the number of sets of the produced video signals being equal to the first predetermined number; and a television monitor for receiving the video signals and for reproducing corresponding frames of the moving picture.

19. A video reproduction device of claim 18, wherein the detection unit repeatedly detects the amount of the video data presently stored in the buffer memory at a predetermined time interval corresponding to the predetermined time period, the detected amount of the video data falling in either one of a first predetermined amount range and at least one second predetermined amount range lower than the first predetermined amount range, and wherein the command producing unit determines one of the first and second predetermined amount ranges in which the detected data amount falls, the command producing unit producing the reproduction speed command indicative of the first number of sets of video data to be retrieved from the buffer memory in the predetermined time period when the detected data amount falls in the first amount range, the command producing unit producing the reproduction speed command indicative of each of the at least one second number of sets of video data to be retrieved from the buffer memory in the predetermined time period when the detected data amount falls in a corresponding second amount range.

* * * * *